Patented Apr. 5, 1938

2,113,380

UNITED STATES PATENT OFFICE 2,113,380

EXTENDED PIGMENTS

James B. Nichols, Wilmington, Del., assignor, by mesne assignments, to E. I. du Pont de Nemours and Company, a corporation of Delaware No Drawing. Application July 1, 1935, Serial No. 29,379

6 Claims. (Cl. 134—58)

The present invention relates to pigments in which a prime pigment of a refractive index of about 2.0 or greater is combined with an extender, the refractive index of which is less than about 1.44.

The prime white pigments of high refractive index, useful in my invention, are for instance titanium dioxide, white insoluble titanates, such as for instance calcium-, barium-, magnesium-, zinc-titanate, having a refractive index greater than 2.

The figures of refractive indices as used herein are taken from the literature, for instance, the International Critical Tables, or are calculated from published data, according to the method described on page 1013 of the second volume of Tutton's Crystallography (2nd edition 1922) Mac-Millan & Co., London.

In blending or otherwise combining such prime white pigments with extenders of a refractive index below 1.44, I obtain a remarkable and unexpected increase in the hiding power of the blends when compared with blends containing an extender of a refractive index greater than 1.44.

Most extenders of extremely low refractive index, the use of which is contemplated in my invention, are fluorine compounds as exemplified by the following:

| | Refractive index |
|---|---|
| Sellaite (magnesium fluoride $MgF_2$) | 1.382 |
| Villiaumite (sodium fluoride NaF) | 1.336 |
| Sodium silicofluoride ($Na_2SiF_6$) | 1.299 |
| Chiolite ($2NaF.AlF_3$) | 1.347 |
| Cryolite ($3NaF.AlF_3$) | 1.364 |
| Magnesium silicofluoride ($MgSiF_6.6H_2O$) | 1.349 |
| Pachnolite ($NaF.CaF_2.AlF_3.H_2O$) | 1.413 |
| Calcium fluoride ($CaF_2$) | 1.434 |

For purpose of comparison, I am giving in the table below the refractive indices of various commonly used pigment extenders:

| | Refractive index |
|---|---|
| Blanc fixe ($BaSO_4$) | 1.64 |
| Anhydrite ($CaSO_4$) | 1.586 |
| Gypsum ($CaSO_4.2H_2O$) | 1.524 |
| Calcium carbonate ($CaCO_3$) | 1.601 |
| Barium carbonate ($BaCO_3$) | 1.627 |
| Quartz ($SiO_2$) | 1.547 |
| $MgO.SiO_2$ | 1.655 |
| $2MgO.SiO_2$ | 1.652 |
| $3MgO.3SiO_2.2H_2O$ | 1.501 |
| Talc | 1.572 |
| Kaolinite ($Al_2O_3.2SiO_2.2H_2O$) | 1.564 |
| Pyrophillite | 1.580 |
| Sillimanite | 1.644 |

It will be seen from this table that the refractive indices of all these minerals which have been or may be used as pigment extenders are substantially greater than 1.44.

Refractive indices of prime white pigments are given in the table below:

| | Refractive index |
|---|---|
| $TiO_2$ as anatase | 2.534 |
| $TiO_2$ as brookite | 2.636 |
| $TiO_2$ as rutile | 2.712 |
| Calcium titanate | 2.38 |
| Magnesium titanate | 2.31 |
| ZnS | 2.36 |
| ZnO | 2.015 |

The cost of a blended pigment to be used in formulating a coating composition of the desired opacity or covering power is not solely dependent upon the cost per unit weight of the various pigments and extenders employed, but depends on the actual cost per unit of covering or hiding power obtained in the coating composition.

In the art it is common practice to decrease this unit covering power cost by diluting the prime pigment with cheaper extenders such as barium or calcium sulfate. I have found that a considerably increased hiding power per unit of prime white pigment is obtained if the refractive index of the extender is extremely low, for instance less than about 1.44. The greater unit covering or hiding power obtained by the use of extenders, according to my invention, is due to a number of factors including particle size relationships, but is particularly dependent upon the relationship between the refractive index of the prime pigment and that of the extender. I have found that for blended pigments the difference between the refractive index of the pigment and that of the extender should be as great as possible.

In evaluating the new extenders, I have used several methods by which the hiding or covering power of my blended pigments was measured and compared with pigments containing extenders of a refractive index substantially greater than 1.44. The various methods used and the comparative values obtained are given hereinafter along with the examples in order to illustrate the application of the low refractive index extender plus pigment combinations.

The following examples will further illustrate my invention:

Example I

This example illustrates the advantage of magnesium fluoride over barium sulfate (such as blanc fixe) when used to extend titanium dioxide. The simple pigment plus oil formulation given below was used for evaluation purposes.

The hiding power measurements were made with the Pfund cryptometer.

Pigment _____ { 27 parts TiO$_2$  
{ 73 parts MgF$_2$  
Oil (A) _____ 97 parts  
Oil (A) = _____ { 95 parts linseed oil and  
{ 5 parts blown linseed oil.

For the purpose of comparison, BaSO$_4$ was substituted for the MgF$_2$ in the above formula on an equal volume basis. The comparative hiding power values for TiO$_2$ extended with MgF$_2$ and BaSO$_4$ are given below in terms of square centimeters per gram of TiO$_2$.

Pigment _____ Hiding power (sq. cm./gm.)  
TiO$_2$+BaSO$_4$ _____ 180  
TiO$_2$+MgF$_2$ _____ 212

The values obtained show that 17.8% greater covering power was developed in the case of the MgF$_2$ extended pigment per unit of TiO$_2$.

A number of other low refractive index materials were evaluated by the same method and compared with barium sulfate. Comparative data are given in the following table:

Extender _____ Hiding power (cm.$^2$/gm.)  
BaSO$_4$ _____ 180  
NaF _____ 212  
Al$_2$F$_6$.7H$_2$O _____ 197

The extenders of lower refractive index used gave substantial increases in hiding power over the TiO$_2$+BaSO$_4$ pigment.

Example II

Example I gives values which are based on wet film measurements. In order to present more practical evidence, numerous tests were made in which dry film hiding power values were determined by coating a specially prepared chart designed for the measurement of hiding power and consisting of a pattern of diagonal alternating white and gray stripes. Measurement of the variations in contrast produced by paint coatings was made by means of a specially developed apparatus employing a photoelectric cell arrangement whereby hiding values of different pigment combinations were accurately compared.

In these measurements, paints containing TiO$_2$ extended with various low refractive index extenders were compared with TiO$_2$ extended with an equal volume of blanc fixe. A series of increasing film thicknesses was measured in which both pigments were at the same thickness (grams per square foot). Some results are also given comparing TiO$_2$ plus low refractive index extender mixtures with a commercial TiO$_2$+BaSO$_4$ coalesced pigment.

Furthermore, visual hiding power gradings were made by directly comparing the painted hiding power charts made as described above.

The paint composition used for evaluating cryolite with a refractive index of 1.36 was as follows:

Pigment mixture

| | Parts |
|---|---|
| Cryolite (natural mineral, wet ground) | 70.0 |
| Titanium dioxide | 36.0 |

Vehicle

| | Parts |
|---|---|
| Polyhydric alcohol—polybasic acid resin | 51.0 |
| Drier solution | 2.25 |
| Thinner | 101.0 |

In the following table, the amounts of TiO$_2$ present per square foot are given in the first column. The relative hiding power values of TiO$_2$ extended with cryolite compared with TiO$_2$ extended with blanc fixe are given in the second column. The third column gives the values of the same low refractive index pigments but compared, in this case, with the commercial TiO$_2$ plus BaSO$_4$ pigment. For all film thicknesses the hiding power of the two BaSO$_4$ pigments was assigned an arbitrary value of 100 in order to place all results on a comparative basis.

| (1) | (2) | | (3) | |
|---|---|---|---|---|
| | Ratio of H. P., TiO$_2$+ cryolite to H. P., TiO$_2$+BaSO$_4$ | | Ratio of H. P., TiO$_2$+ cryolite to H. P., TiO$_2$, BaSO$_4$ coalesced pigment | |
| Gms. TiO$_2$/ft.$^2$ | Visual grading | Photoelectric grading | Visual grading | Photoelectric grading |
| 0.459 | 116 | 122 | 117 | 125 |
| .626 | 115 | 115 | | 117 |
| .634 | 119 | 115 | | 117 |
| .800 | 125 | 119 | 126 | 123 |
| .874 | 121 | 120 | | |
| .884 | 119 | 119 | | |
| .926 | 118 | 120 | | |
| .970 | 121 | 119 | 122 | 112 |
| 1.300 | 109 | 117 | | |
| Average | 118.1 | 118.4 | | 118.8 |

Example III

Pigments similar to the one given in Example II were made with other low refractive index extenders in place of the cryolite. These were compared in the same manner with a prepared titanium dioxide plus blanc fixe mixture in which an equal volume of extender was used. The hiding power comparisons were based on photoelectric measurements and the average values for each extender are given instead of the individual values for each film thickness. The barium sulfate composition was given an arbitrary value of 100 for each case.

| Extender | Hiding power |
|---|---|
| Na$_2$SiF$_6$ | 122 |
| MgF$_2$ | 118 |
| CaF$_2$ | 110 |
| BaSO$_4$ | 100 |

The extenders of the class covered by this invention may be associated with the high refractive index pigments in any of a number of ways, including simple mixing, wet mixing, wet grinding, dry grinding and by other mixing or blending processes.

As no special effort was made to insure optimum particle size distribution to obtain maximum hiding power, it can readily be seen that my invention is not limited to the use of extenders of any particular particle size characteristics. However, the maximum size is limited by the amount of large particles, or grit, that would be objectionable in the final coating composition. The minimum size is limited by the cost of the processing necessary to secure this size.

A number of extender materials which were employed in this work were naturally occurring minerals. I do not imply that the invention is limited to the use of processed natural minerals but includes synthetic products as well. In certain cases such materials may be less expensive than natural minerals which have to be processed in order to meet the requirements of color, purity and particle size demanded of extenders for white pigments.

I further prefer to use the low refractive index materials which have a low solubility in water such as $CaF_2$, $MgF_2$, cryolite ($3NaF.AlF_3$) and other similar compounds.

Due to the wide application of $TiO_2$, and other prime pigments and to the variety of hiding power requirements, I do not wish to set limits as to the amount of extender which is to be blended with the prime white pigment. I have found that very satisfactory pigment mixtures were obtained in which approximately 27 parts by volume of $TiO_2$ were associated with 73 parts by volume of the extender. These values are expressed in volume relationships (based on known specific gravity data) which are more satisfactory as the different extending materials vary in specific gravity. I am not bound, however, by the above mentioned volume relationship as very satisfactory products are obtained over a wide range depending on the use for which the pigment is intended. For certain uses where a high hiding power is required, the ratio of $TiO_2$ to extender may be increased and where lower hiding is satisfactory, the ratio may be decreased.

I further wish to point out that my new low refractive index extenders are found to be most advantageously used in types of coating compositions which have a gloss finish such as enamels, house paints, etc. They are otherwise used in substantially the same manner as ordinary titanium pigments.

I claim:

1. A non-coalesced composite pigment comprising a prime white pigment of a refractive index of at least about 2 and a difficultly water soluble fluorine compound extender of a refractive index less than about 1.44, said pigment being suitable for use in an opaque non-aqueous coating composition and when used in such a composition has a hiding power greater than that of a similar composition in which said low refractive index extender has been replaced by a difficultly water-soluble fluorine compound extender of an index of refraction greater than 1.44.

2. A non-coalesced composite pigment comprising a pigment selected from the group of pigments consisting of titanium dioxide and white insoluble titanates, and a difficultly water-soluble fluorine compound extender of a refractive index less than about 1.44, said pigment being suitable for use in an opaque non-aqueous coating composition and when used in such a composition has a hiding power greater than that of a similar composition in which said low refractive index extender has been replaced by a difficultly water-soluble fluorine compound extender of an index of refraction greater than 1.44.

3. A non-coalesced composite pigment comprising pigment $TiO_2$ and a difficultly water-soluble fluorine compound extender of a refractive index less than about 1.44, said pigment being suitable for use in an opaque non-aqueous coating composition and when used in such a composition has a hiding power greater than that of a similar composition in which said low refractive index extender has been replaced by a difficultly water-soluble fluorine compound extender of an index of refraction greater than 1.44.

4. A non-coalesced composite pigment comprising pigment $TiO_2$ and as an extender of an index of refraction less than about 1.44 an insoluble fluorine compound having a refractive index less than about 1.44, said pigment being suitable for use in an opaque non-aqueous coating composition and when used in such a composition has a hiding power greater than that of a similar composition in which said low refractive index extender has been replaced by a difficultly water-soluble fluorine compound extender of an index of refraction greater than 1.44.

5. A non-coalesced composite pigment comprising pigment $TiO_2$ and an extender of an index of refraction less than about 1.44 selected from the group of fluorine compounds consisting of sodium fluoride, magnesium fluoride, calcium fluoride, sodium-aluminum fluoride, sodium-calcium-aluminum fluoride, sodium silico fluoride and magnesium silico fluoride, said pigment being suitable for use in an opaque non-aqueous coating composition and when used in such a composition has a hiding power greater than that of a similar composition in which said low refractive index extender has been replaced by a difficultly water-soluble fluorine compound extender of an index of refraction greater than 1.44.

6. A non-coalesced composite pigment comprising a pigment selected from the group of pigments consisting of titanium dioxide and white insoluble titanates and as an extender a fluoride of an index of refraction less than about 1.44, said fluoride being selected from the group of fluorides consisting of sodium fluoride, magnesium fluoride, calcium fluoride, sodium-aluminum fluoride, sodium-calcium aluminum fluoride, sodium silico fluoride and magnesium silico fluoride, said pigment being suitable for use in an opaque non-aqueous coating composition, and when used in such a composition has a hiding power greater than that of a similar composition in which said low refractive index extender has been replaced by an extender of an index of refraction greater than 1.44.

JAMES B. NICHOLS.

CERTIFICATE OF CORRECTION.

Patent No. 2,113,380.  April 5, 1938.

JAMES B. NICHOLS.

It is hereby certified that error appears in the printed specification of the above numbered patent requiring correction as follows: Page 3, first column, line 47, claim 1; same column, line 59 and second column, line 1, claim 2; lines 11 and 12, claim 3; lines 23 and 24, claim 4; and line 39, claim 5, strike out "a difficultly water-soluble fluorine compound" and insert instead the article an; same column, lines 15 and 16, claim 4, strike out "of an index of refraction less than about 1.44"; and that the said Letters Patent should be read with these corrections therein that the same may conform to the record of the case in the Patent Office.

Signed and sealed this 24th day of May, A. D. 1938.

(Seal)

Henry Van Arsdale,
Acting Commissioner of Patents.